(12) United States Patent
Sahlbach

(10) Patent No.: US 7,171,554 B2
(45) Date of Patent: Jan. 30, 2007

(54) METHOD, COMPUTER PROGRAM PRODUCT AND SYSTEM FOR PROVIDING A SWITCH USER FUNCTIONALITY IN AN INFORMATION TECHNOLOGICAL NETWORK

(75) Inventor: Andreas Sahlbach, Boeblingen (DE)

(73) Assignee: Hewlett-Packard Company, Fort Collins, CO (US)

( * ) Notice: Subject to any disclaimer, the term of this patent is extended or adjusted under 35 U.S.C. 154(b) by 970 days.

(21) Appl. No.: 09/928,859

(22) Filed: Aug. 13, 2001

(65) Prior Publication Data

US 2003/0033521 A1    Feb. 13, 2003

(51) Int. Cl.
*H04L 9/00* (2006.01)
*H04K 1/00* (2006.01)
*G06F 15/173* (2006.01)

(52) U.S. Cl. ............ 713/156; 713/155; 713/182; 380/257; 709/223; 709/224; 709/225

(58) Field of Classification Search ............ 713/156, 713/200, 159, 158, 157; 709/225, 226, 229, 709/227
See application file for complete search history.

(56) References Cited

U.S. PATENT DOCUMENTS 6,886,038 B1 * 4/2005 Tabbara et al. .......... 709/229

2002/0019932 A1 * 2/2002 Toh et al. .................. 713/155
2003/0037177 A1 * 2/2003 Sutton et al. .............. 709/316

OTHER PUBLICATIONS

Microsoft W indows 2000 Security, Technical Reference, 2000, pp. 5, 22-23, 89-151, 154-155 English.
B. Schneier: Applied Cryptography, 2nd edition, 1996, pp. 34-41,429-502 English.
Online Help HP Open View VangtagePoint for W indows page "Scheduled Command", 2000 English.
VantagePoint for W indows, Concepts Guide, HP Open View, 2000 pp. 1-79 English.

* cited by examiner

*Primary Examiner*—Matthew Smithers
*Assistant Examiner*—Courtney D. Fields

(57) ABSTRACT

The invention is directed to a method for providing a switch user functionality in a server-agent environment in an information technological (IT) network in which at least one agent runs on a node of the IT network, comprising: generating a switch user (SU) certificate using public-key cryptography upon receiving a request to switch from a user account presently used on the node to another user account; sending the SU certificate to the agent; checking the correctness of the SU certificate; performing the requested switch to the other user account provided that the SU certificate is correct. The invention is also directed to a corresponding computer program product and a computer system.

24 Claims, 4 Drawing Sheets

METHOD, COMPUTER PROGRAM PRODUCT AND SYSTEM FOR PROVIDING A SWITCH USER FUNCTIONALITY IN AN INFORMATION TECHNOLOGICAL NETWORK

FIELD OF THE INVENTION

The present invention relates generally to server-agent environments, and more particularly to a method, a computer program product and a system for providing a switch user functionality in such an environment.

BACKGROUND OF THE INVENTION

Nowadays, as information systems become ubiquitous, and companies and organizations of all sectors become dependent on their computing resources, the requirement for the availability of the hardware components and software components (applications) of an IT network and of services based on it, (hereinafter all three are generally referred to as "objects") is increasing while the complexity of IT networks is growing.

There are network management systems available which enable the availability and performance of objects within an IT network to be monitored and managed. For example, Hewlett-Packard offers such network monitoring and managing tool, which is a server-based, under the name "OpenView". The product is available for Windows and Unix operating systems. It comprises a management server, a user interface to operate the server and several "agents" for different operating-system platforms. An agent is a program or process which runs on a managed node. A personal computer, network node (in the narrow sense) or any system with a CPU is called a node. A managed node is a node which is monitored and/or managed by the management system.

In order to allow the users of such a system to react to network problems, the agents implement a feature which enables software tools or applications to be started remotely. For example, if the operator of the system detects a possible problem on the monitored node, he can, via the management server and using the user interface, initiate the start of a software tool on the monitored node which carries out diagnosis, recovery, repair and/or reconfiguration actions.

Often, such a tool must be started using a different user account than the account of the operator. To achieve this, the agent has a built-in "switch user" functionality which allows the operator to change his account to the user account which is needed. To use this functionality on Windows NT systems, the agent calls a Windows NT application programming interface (API) in a particular way which is not transparent for normal users, e.g. by including a certain code which is generated by the agent software independent and is independent from the account to which the switch user is to be performed. The call will be forwarded to the Windows NT domain controller. A sub-authentication component (a dynamic link library (DLL) component), which extends the standard Windows NT user name and password authentication component on the domain controller, will receive that call and verify that the call has been performed in the correct way, e.g. by checking the code word (the standard Windows NT authentication component is, for example, described in Microsoft Windows 2000 Security Technical Reference, Redmond, 2000, pages 22–23 and 154–155). If the check reveals that the call has been made correctly, it will allow the agent to perform the switch user to the requested account. The password of the account is not needed by the agent or the domain controller to perform the user switch.

SUMMARY OF THE INVENTION

The invention provides a method for providing a switch user functionality in a server-agent environment in an information technological (IT) network. At least one agent runs on a node of the IT network. The method comprises the following steps: generating a switch user (SU) certificate using public-key cryptography upon receiving a request to switch from a user account presently used on the node to another user account; sending the SU certificate to the agent; checking the correctness of the SU certificate; performing the requested switch to the user account provided that the SU certificate is correct.

According to another aspect, the invention provides a computer program product including program code for providing a switch user functionality in a server-agent environment in an information technological (IT) network, in which at least one agent runs on a node of the IT network. Said program code is for: generating a switch user (SU) certificate using public-key cryptography upon receiving a request to switch from a user account presently used on the node to another user account; sending the SU certificate to the agent; checking the correctness of the SU certificate; performing the requested switch to the user account provided that the SU certificate is correct.

According to still another aspect, the invention is directed to a system for managing objects in an information technological (IT) network having a network management server and at least one management agent which runs on a managed node of the IT network. The system provides a switch user functionality. It comprises: an SU certificate generation component which uses public-key cryptography; an SU certificate sending component which sends the certificate to the agent; an SU certificate checking component; a user account switching component performing the requested switch provided that the SU certificate is correct.

Other features are inherent in the system, computer program product and method disclosed or will become apparent to those skilled in the art from the following detailed description of embodiments and its accompanying drawings.

DESCRIPTION OF THE PREFERRED EMBODIMENTS

Figure 1:
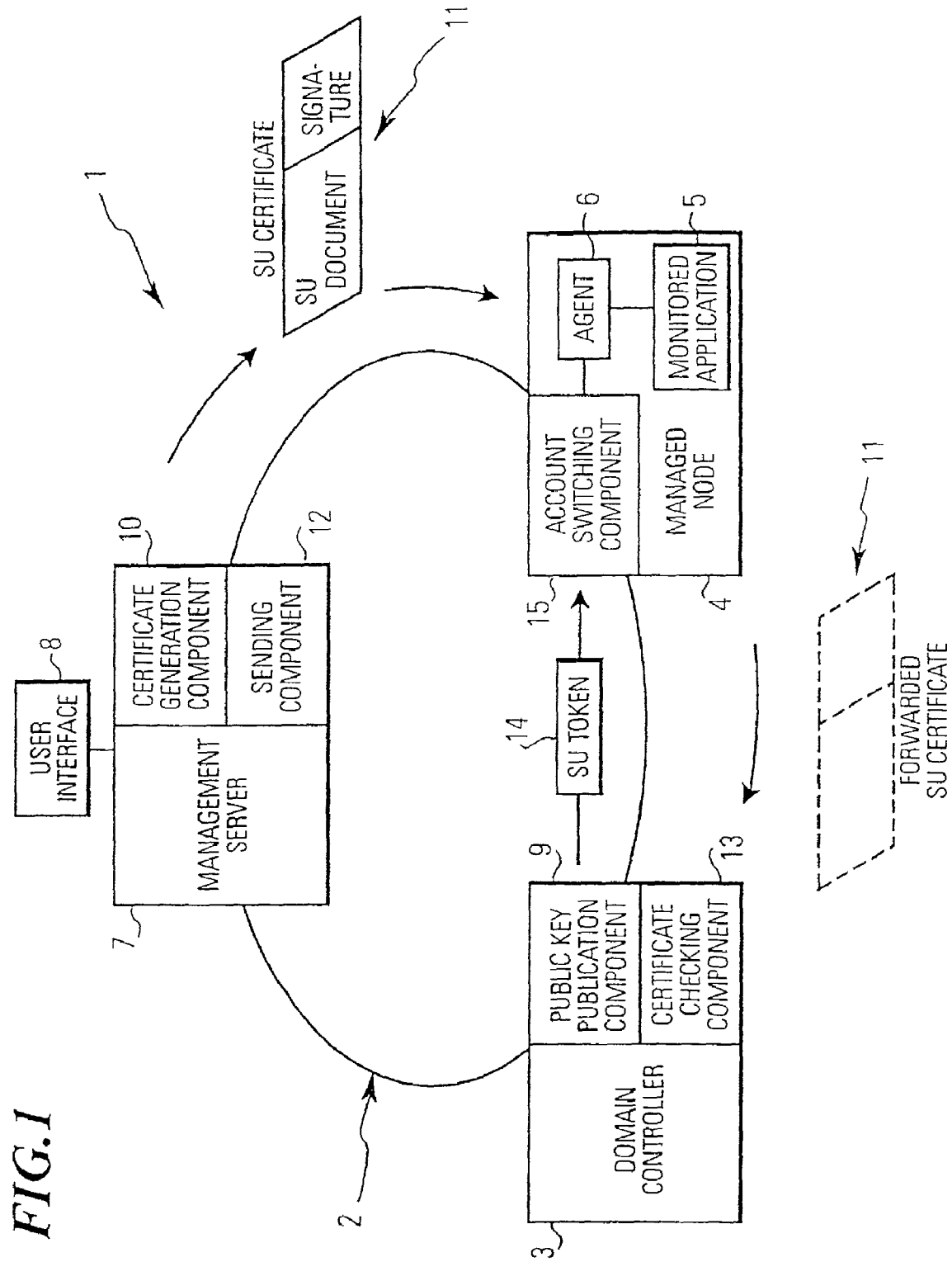
FIG. 1 shows a high-level architecture diagram of an object managing system which provides a switch user functionality.

FIG. 1 shows a high-level architecture diagram of a preferred embodiment. Before proceeding further with the description, however, a few items of the preferred embodiments will be discussed.

In the preferred embodiments, a switch user functionality is provided in a server-agent environment in an IT network, such as a computer network or a telecommunication network. A node is a network object such as a PC, network node (in the narrow sense) or any system with a CPU. An agent is a program or process running remotely on a node. For example, an agent may be able to respond to requests from the server relating to the node or an application residing on it, perform operations and/or send notifications to the server relating to the node or the application.

In the preferred embodiments, the server-agent environment is a network management environment which enables monitoring and management of nodes of the IT network, which are called "managed nodes". The object to be managed and monitored may be the managed node, an application (or part of an application) running on it or a hardware resource needed by the application (such as a storage disk). The monitoring may comprise passive monitoring (e.g. collecting error messages produced by the objects) or active monitoring (e.g. by periodically sending a request to the object and checking whether it responds and, if applicable, analyzing the contents of the response). Management tasks may be, for example, diagnosis tasks, error correcting or fixing tasks, setting tasks or other network services.

In the preferred embodiments, the server of the server-agent environment is a management server which controls, administers, records, analyses and/or displays the management activities and events. The agents are management agents which respond to monitoring or management requests, perform the actual monitoring or management operations and/or send event notifications.

It has been recognized by the inventor of the present invention that, in the prior art mentioned at the outset, the agent software is in a relatively insecure environment since it is distributed over several or all managed nodes in a network domain (which can involve a whole network). Therefore, an agent could be target of "reverse engineering". It cannot be excluded that a malicious user could intercept a switch user call and find out how the agent is able to perform the switch user and to simulate the behavior with a self-written program.

In order to exclude such possible attacks, in the preferred embodiments a switch user (SU) certificate is generated when a switch user request is received, using public-key cryptography.

In the preferred embodiments, the SU certificate is generated by the management server, which sends it to the agent. The agent, in turn, forwards the received SU certificate to a domain controller which carries out the check of the correctness of the SU certificate and allows the agent to perform the requested switch user. The management server and domain controllers are normally in a secure environment and can be seen as save.

In the preferred embodiments, the SU certificate is generated with a digital signature public-key algorithm, such as RSA or DSA. Digital signatures and public-key algorithms are, for example, described in B. Schneier: "Applied Cryptography, $2^{nd}$ edition, 1996, pages 34–41, 461–474 and 483–494.

In the preferred embodiments, a private and public key pair is available before the SU certificate is generated. For example, the key pair can be generated during the set-up of the management system. A renewal of the key pair can be performed manually or automatically from time to time. Recent operating systems support key generation; for example, an RSA key can be generated using the Windows NT Crypto API.

In the preferred embodiments, the public key is made public for "everybody" (i.e. every node and process) within the network or a domain of the network in which the check of the correctness of the SU certificate is performed. The publication of the public key can be realized by storing the public key such that it can be accessed from all the nodes in the network or domain but cannot be modified by them; only the component which generates the key pair (e.g. the management server) can modify this information. For example, the Windows 2000 Active Directory already provides this infrastructure so that the above-described public key publication can easily be implemented in Windows 2000 domains using the Active Directory (see Windows 2000 Security Technical Reference, pages 89–151).

The generation of the SU certificate comprises signing an SU document with the private key. The check of the SU certificate comprises verifying the signature with the public key. There are many public-key digital signature algorithms with different implementations (see Schneier, pages 39 and 461–502). In the most common algorithm, RSA, the signing process is called encrypting with a private key and the verification process is called decrypting with a public-key. The verification comprises checking the authenticity and integrity of the transmitted SU certificate. In other words, it is verified that the SU certificate originates from the management server and that it has not been modified in transit.

Apart from choosing a particular public-key algorithm, there are different possible ways to actually generate a signature. When, for example, RSA is used, the plaintext SU document (or that part of it which has to be secured) is encrypted with the public key, and the resulting ciphertext represents the signature. In order to verify the signature, it is decrypted with the public key. For the verification, it is sufficient that the resulting decrypting text is meaningful, since it is a feature of the used strong encryption algorithms that a decryption with a wrong public key or any modification of the signature would result in a completely different plaintext with generally no meaning. It is likewise possible to explicitly check whether the result of the decryption is identical with the original plaintext SU document, which, for example, can be transmitted together with the signature and form part of the SU certificate.

Since the signing process using the whole (plain) data is generally time consuming, by preference another possibility is chosen. A relatively unique representation (also called a "fingerprint" or "message digest") of the data (i.e. the SU document) is first generated using a process in which the data is "condensed" or "hashed", for example by means of a message digest function (e.g. a one-way hash function) into a value of relatively small length, thereby fixing its contents, and the signing process is performed on the fingerprint, resulting in an equivalent effective authentication. Therefore, the term digital signature herein refers to the digital signature of either the plain data element(s) or of any representation (function) thereof. According to this second possibility, the transmitted SU certificate is composed of the original SU document in plaintext and, in addition, the fingerprint of this document, encrypted with the private key. To verify an SU certificate, the plaintext part of the certificate is condensed by means of the same message digest function (e.g. the one-way hash function) and the resulting message digest (hash) value is compared with the fingerprint decrypted with the public key. If these values are equal, the authenticity and integrity of the SU certificate is verified. Since the plaintext is generally bigger than the message digest, the message digest does not uniquely specify the plaintext—it is possible for many plaintexts to have the same message digest. However, the message digest has the following characteristics which makes it useful: i) A message digest is one-way, in the sense that, given a specific message digest, it is computationally unfeasible to find a plaintext with that message digest. Thus, the correspondence between a given message digest and a given plaintext can be verified, but the plaintext cannot be recovered from the message digest. ii) It is computationally unfeasible to find two messages with the same message digest. Thus, in practical terms, if a message digest is verified for a given message, it can be assumed that it was generated from that message. As a result of these two properties, the message digest can be relied upon as a concise summary of the plaintext, and it can be substituted for the plaintext in the digital signature algorithm. Suitable message digest functions are, for example, MD5 and MD4 (see Schneier, pages 429–459).

In the preferred embodiments, the SU certificate comprises the account name to which the account is to be switched and an identification of the node for which the switch is to be performed. The account name and the identification are secured by the signature. In the checking step it is verified that the node identification actually corresponds to the node to which the switch user request is directed. This ensures that a certificate may not be used by an attacker for another node.

Preferably, the SU certificate contains no password specific for the account to which the switch is to be performed. This is because a password-identification system would require reasonable administrative effort because all password changes in the network would have to be followed by all network nodes. In addition, if the password were transmitted with the SU request, an attacker might be able to catch and decrypt it and use it for malicious purposes. The password-less switch user functionality of the preferred embodiments requires little administrative effort and is secure due to the use of the described switch user certificates.

In order to avoid what is called replay attacks, the SU certificate should also preferably comprise a time stamp and/or another certificate identification stamp. For example, the time stamp indicates the point of time of the certificate's generation. When the certificate is checked, it is then also verified that the certificate is not outdated and/or has not been used before by means of the time stamp or the certificate identification stamp. For example, if the "lifetime" of a certificate is defined to be five minutes, the certificate older than this lifetime would be rejected in the check. A certificate which is younger than the lifetime will pass this check, however, an additional check is performed as to whether the certificate has already been used by a different request. To this end, the component which is responsible for the check stores data (for example, the certificate identification stamp) of all certificates from the last five minutes. By comparing the present certificate data with all stored ones, it can find out that a certificate has already been used, and will then deny the switch user request. If the present request passes all the checks successfully, the certificate checking component will store the present certificate's data and will remove all stored certificate data which is older than the lifetime. Then it will allow that the switch user is performed.

The preferred embodiments of the computer program product comprise digital program code which, for example, is stored on a computer-readable data carrier or is in the form of signals transmitted over a computer network. The preferred embodiments of the program code are written in an object-oriented programming language (e.g. Java or C++). The program code can be loaded (if needed, after compilation) and executed in a computer or in networked computers, e.g. a management server network with managed nodes.

Returning now to FIG. 1, it shows a high level architecture diagram of a preferred embodiment of an object management system 1 which provides a switch user (SU) functionality. The system 1 is part of a network 2 which comprises a domain controller 3 and nodes 4, one of which is shown in FIG. 1. A domain constitutes an administrative and security boundary within a network. A domain controller provides domain-related administrative and security services to the network nodes and users. For example, it stores domain-wide directory data (such as the system security policy) and manages user domain interactions, including user-logon, authentication and directory searches (see Microsoft Windows 2000 Security, pages 5 and 95).

The node 4 is monitored and managed by the object management system 1, and is thus called a "managed node". An application 5 which is monitored by the management system 1 runs on the managed node 4. The monitored application 5 can be part of a complex application (for example, an SAP application) which may be distributed over several nodes. An agent 6 monitors the application 5. The agent 6 is a program running on a remote device (here the node 4) that responds to monitoring or management requests from a management server 7, performs monitoring and management operations regarding the monitored application 5 and the managed node 4, and/or sends event notification to the management server 7. In other preferred embodiments, the agent runs on a remote or external node which is different from the node which hosts the monitored application. If they are several applications to be monitored on one managed node, they will be preferably monitored by one and the same agent. Although there is normally one agent per managed node, in other embodiments one agent can manage several nodes. The agent 6 is configured by a set of specifications and rules, called policy for each application 5 to be monitored. A policy tells the agent what to look for and what to do when an event occurs. For example, according to a particular policy an agent filters events and generates messages which inform the management server 7 about the occurrence of certain events and/or the status and performance of the monitored application 5. The agent 6 also implements a feature to start tools or applications on the managed node 4 from the management server 7. These may be, for example, diagnosis tasks, error correcting or fixing tasks or setting tasks.

The management server 7 provides centralized management services, processes and/or a management user interface 8 to the management operator and other users. In particular, the management server 7 collects events and performance data from the agent 6, processes them and roots the results to a monitoring console (for example, the user interface 8). The management server 7 also centrally deploys deployment packages, agents and policies, as directed by the user, and stores definitions and other key parameters. The remote management tools and applications mentioned above are also started by a user via the user interface 8 and the management server 7.

During the set-up of the operating system or the management system, a private and public key pair is generated by the management server 7 using the Windows NT Crypto API. The management server keeps the private key secret and publishes the public key using the domain controller's Windows Active Directory, which is designated as public key publication component 9 in FIG. 1. If the management system operator wants to start a tool on the managed node 4 which requires a switch to another account he is currently using, he initiates the call to the corresponding tool and the request to switch to the other account, without providing the password of the account, via the user interface 8. When the management server 7 gets the request, it generates an SU certificate by means of a certificate generation component 10, using the private key. The SU certificate 11 is sent by means of a sending component 12 to the managed node 4 together with a usual call to start the tool under the requested account. The agent 6 receives the call and forwards the certificate to the domain controller 3 by calling the Windows NT API. The domain controller 3 comprises a DLL component which is designated as the certificate checking component 13 in FIG. 1. It is specifically adapted to the management server system 1 in order to allow a switch to another user account without a password. The DLL component 13 checks the certificate 11 using the public key of the management server 7 which is published by the public key publication component 9. If the check reveals that the SU request is acceptable, the DLL component 13 authorizes the switch user by returning an SU token 14 to the agent 6. In turn, an account switching component 15 of the agent 6 performs the switch to the requested other user account, and the agent 6 performs the tool, according to the request sent by the management server 7.

Figure 2:
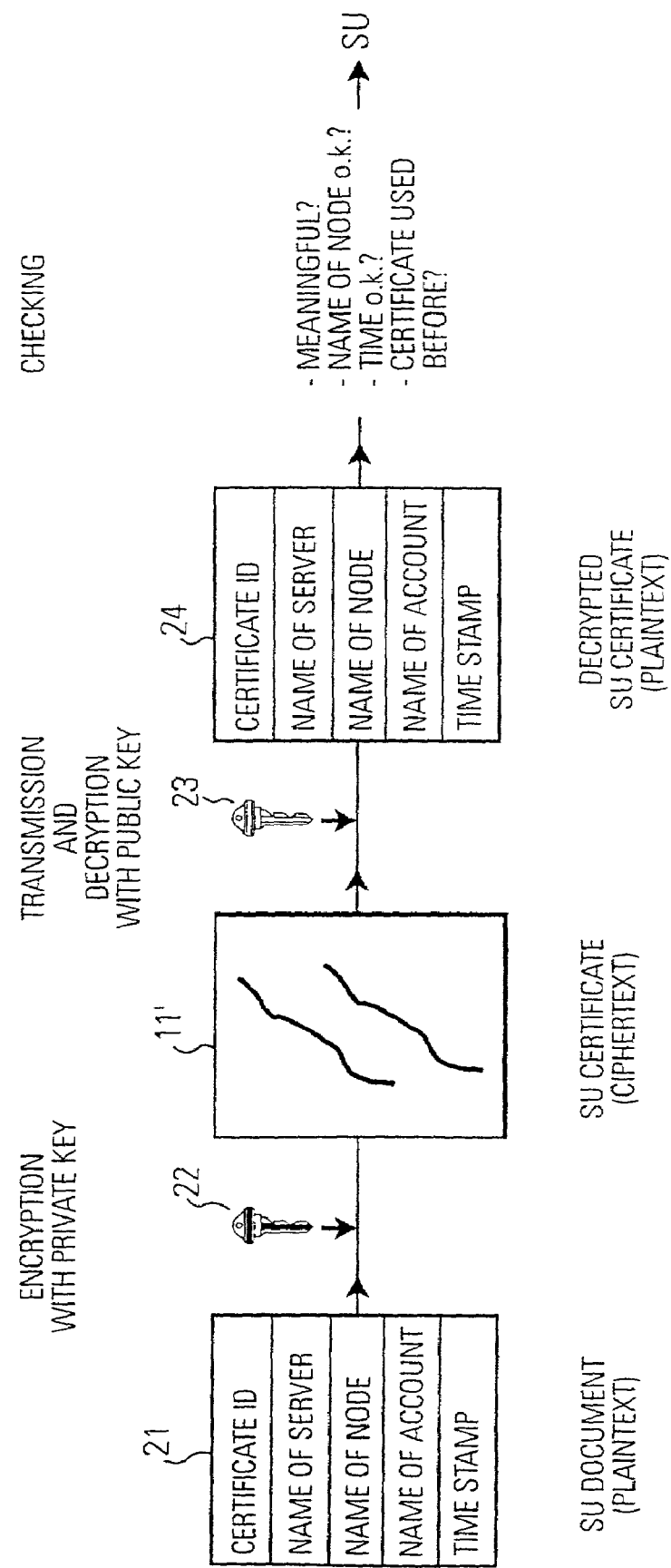
FIG. 2 illustrates the generation and checking of an SU certificate according to a first embodiment.

The generation and checking of an SU certificate according to a first embodiment is illustrated in FIG. 2. At first, the plaintext SU document 21 is generated which contains switch user identification data. In the shown embodiment, it contains five such data: A certificate identifier, the name of the management server, the name of the managed node on which the switch user is to be performed, the name of the account to which the switch user is to be performed, and a time stamp. The SU document 21 is then encrypted with the management server's private key 22. The resulting ciphertext 11' of the SU document 21 is a what is called a digital signature of the SU document 21 and can be used as the certificate 11 in FIG. 1. The certificate 11' is then transmitted to the node 4 on which the switch user is to be performed and is forwarded to the DLL component 13 of the domain controller 3. The DLL component 13 decrypts the certificate 11' using the public key 23, and thus obtains a decrypted SU certificate 24. If the SU certificate 11' has not been modified during transmission and has been decrypted with the correct public key (i.e. the management server's public key), the decrypted SU certificate 24 is identical with the original plaintext SU document 21. The subsequent step of checking is carried out using the decrypted SU certificate 24. In particular, it is checked whether the contents of the decrypted SU certificate 24 is meaningful (for example, if it contains the correct name of the management server). If this is the case, the authenticity and integrity of the SU certificate 11' is proven. Alternatively, it can be checked whether the decrypted SU certificate 24 is identical with the plaintext SU document 21 (which may be transmitted together with the SU certificate 11') in order to verify authenticity and integrity. Furthermore, it is checked whether the name of the node indicated in the decrypted SU certificate 24 corresponds to the node 4 for which the switch user is requested. Further, it is checked whether the certificate is still within its lifetime, i.e. whether the time indicated in the time stamp of the decrypted SU certificate 24 does not indicate a time which lies more than the predetermined lifetime (e.g. 5 min) in the past. Finally, if the certificate is still within its lifetime, it is checked whether the certificate has been used before, for example by comparing the certificate identifier of the decrypted SU certificate 24 with stored identifiers of those SU certificates which have been processed in the past within the certificate's lifetime (e.g. within the last 5 min). The certificate identifier is optional: In other embodiments, there is no certificate identifier, and another data (for example the time stamp) is used for the comparison. If all these checks reveal that the certificate is authentic, has not been modified, corresponds to the correct node, is not outdated and has not been used before, the requested switch user is accepted, and, therefore, initiated.

Figure 3:
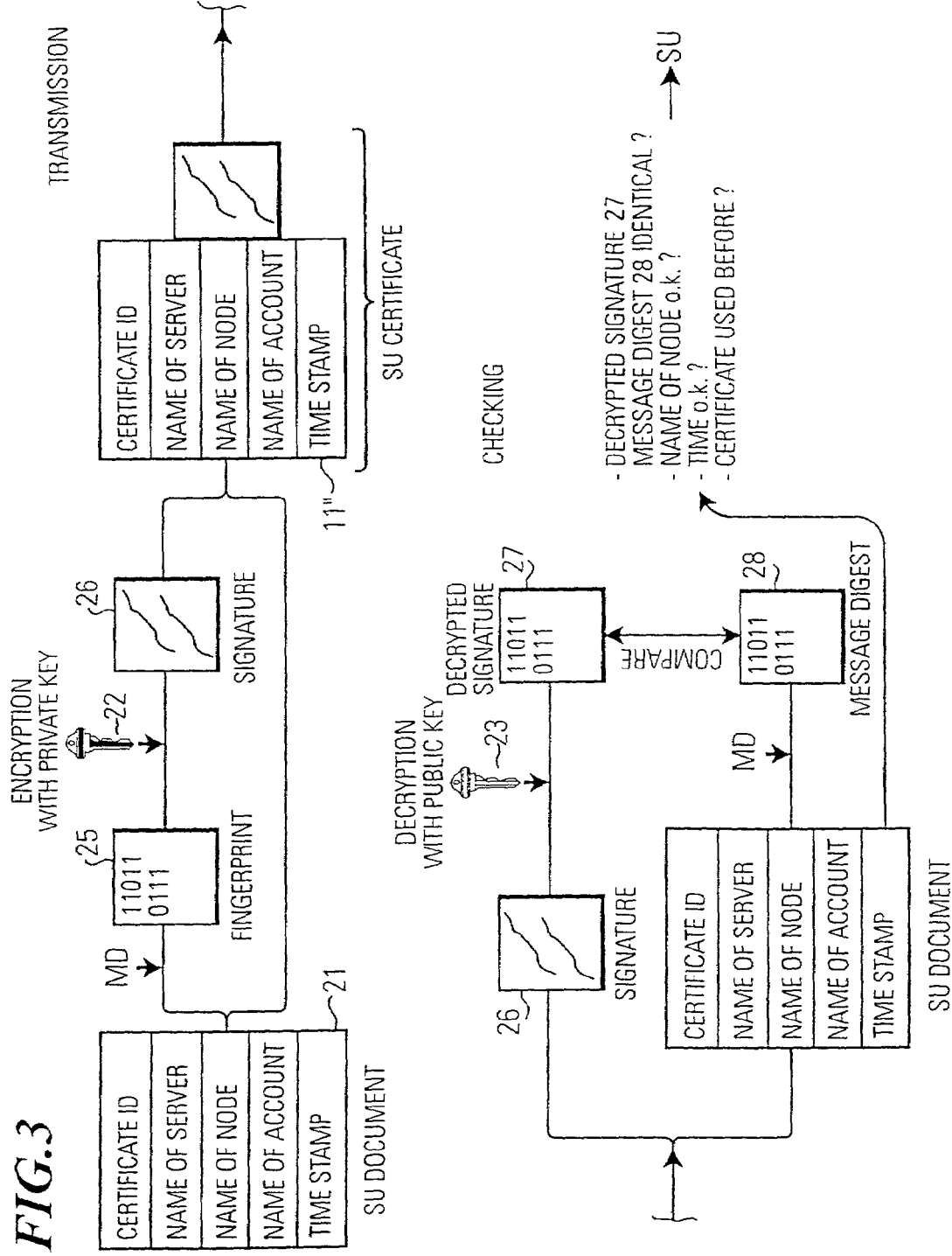
FIG. 3 illustrates the generation and checking of an SU certificate according to a second embodiment.

FIG. 3 illustrates the generation and checking of an SU certificate according to a second embodiment. As with the first embodiment, the first step is the generation of the plaintext SU document 21. It contains the same switch user identification data as the SU document 21 described in connection with FIG. 2. Different from the embodiment of FIG. 2, a message digest function MD is applied to the SU document 21, resulting in a fingerprint 25 of the SU document 21, which has a reduced length (for example 128 bits). Then, instead of the SU document 21, only its fingerprint 25 is encrypted with the private key 22. The encrypted fingerprint constitutes a digital signature 26 of the SU document 21 according to the second embodiment. The signature 26 is then combined with the plaintext SU document 21. Their combination forms the certificate 11" according to the second embodiment, which can be used as the certificate 11 in FIG. 1. The certificate 11" is then transmitted to the node 4 and forwarded to the DLL component 13 of the domain controller 3, as with FIG. 2. The DLL component 13 decrypts the signature 26 with the public key 23, which reveals the decrypted signature 27. If the correct public key has been used and the signature 26 has not been modified, the decryption of the signature 26 reveals the original fingerprint 25. Further, the DLL component 13 generates a message digest 28 of the plaintext SU document part of the certificate 11". The decrypted signature 27 and the message digest 28 of the plaintext part of the certificate 11" are then compared. If they are identical, the authenticity and integrity of the certificate 11" is verified since any modification of the plaintext part of the certificate 11" would result in a different message digest 28 and a decryption of the signature 26 with a wrong public key or any modification of the signature would have the consequence that the decrypted signature 27 is different from the signature 26 and, thus, from the message digest 28. The other checks correspond to the ones described in connection with FIG. 2 and need not be repeated here. If the results of all checks are satisfactory, the requested switch user is initiated.

The purpose of the inclusion of the data "name of the server" in the SU certificates 11' and 11" of FIGS. 2 and 3 is to enable the agents to handle SU requests from different management servers, each having its own private and public key pair. Such an environment is also called a Manager of Manager environment. Since the name of the "certificate holder" is known, the DLL component 13 is able to check the certificate with the correct key and, thus, to verify that the request actually comes from a valid management server. It should be noted that in the embodiment of FIG. 2 the certificate 11' has to contain the name of the server (also) in plaintext in order to identify the correct public key needed for the decryption of the encrypted part of the certificate 11'. In embodiments with only one management server, the data "name of the server" can be omitted.

Figure 4:
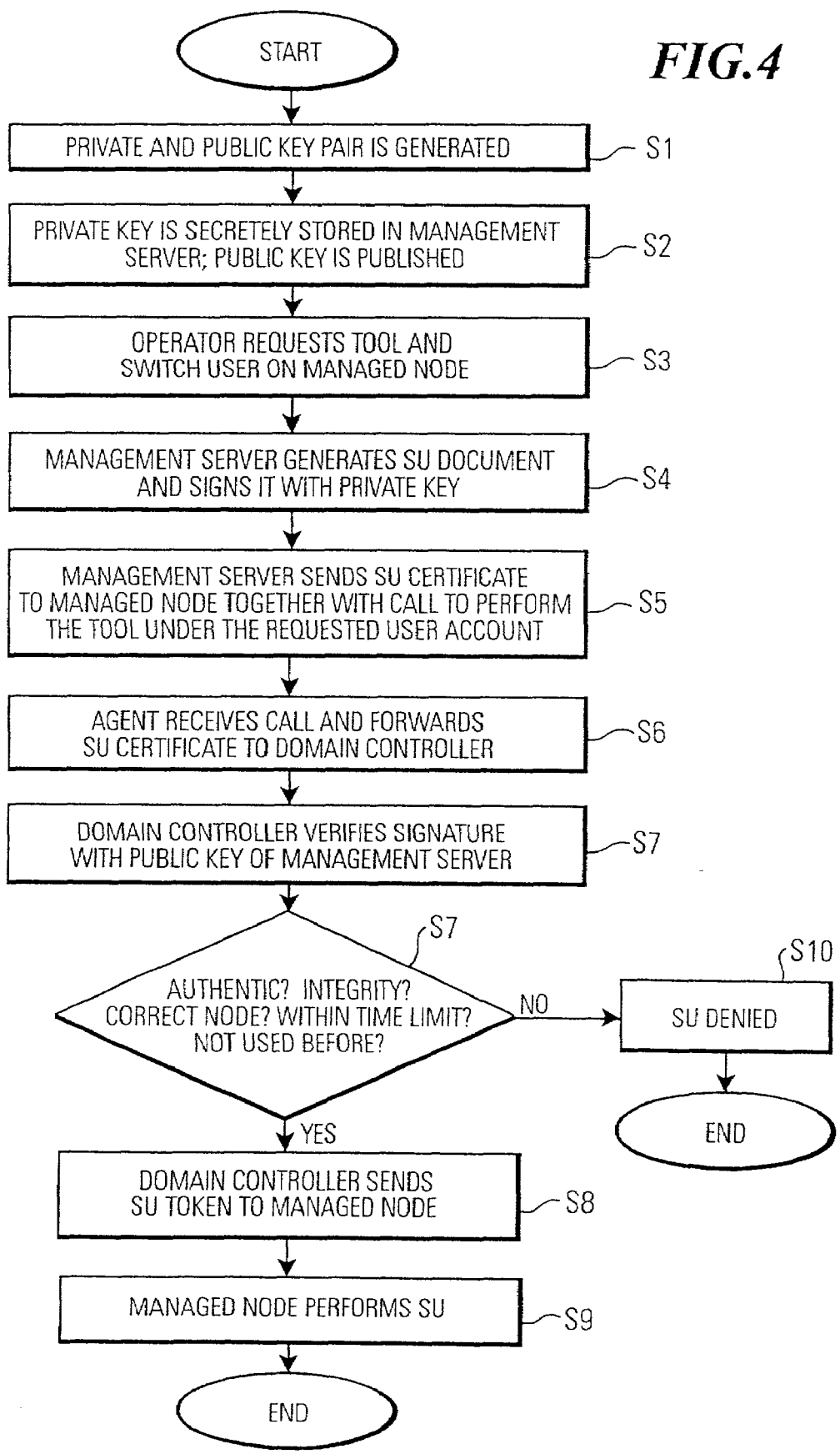
FIG. 4 is a flow chart of a switch user certificate method using the generation and checking method of FIG. 3.

FIG. 4 shows a flow chart of a switch user method using the certificate generation and checking method of FIG. 3. In step S1 a private and public key pair is generated. In step S2 the private key is secretly stored in the management server's secure environment, and the public key is published. The steps S1 and S2 are carried out during system set-up and, optionally, also periodically after the system set-up. Step S3 (and the following steps) are performed when the operator requests a tool and a switch user on a managed node. In step S4, the management server generates an SU document and signs it with the management server's private key. The result is an SU certificate. In step S5 the management server sends the SU certificate to the managed node together with a call to perform the tool under the requested account. In step S6 the agent receives a call with the SU certificate and forwards the SU certificate to the domain controller. In step S7 the domain controller verifies the signature with the public key of the management server. In particular, it verifies that the SU document received by the agent is authentic and has not been modified. In addition, it is ascertained whether the certificate has actually been directed to the correct node, whether it is still within its lifetime and whether it has not yet been used before. If the answers to all these questions are positive, the domain controller returns in step S8 an SU token to the managed node. In step S9, the managed node performs the switch user and starts the tool, as was requested in step S3. If the answer to any of the questions in step S7 is negative, the switch user request is denied in step S10. After steps S9 and S10, the method is prepared to perform another switch user sequence with steps S3 to S9 or S3 to S7 and S10.

Thus, a general purpose of the preferred embodiments is to provide an improved method, computer program product and system for providing a switch user functionality not requiring a password in an IT-network. In particular, the preferred embodiments prevent: (i) an attacker who "catches" a switch user call from gaining relevant information from it, since no password is provided with the call; (ii) an attacker from being able to reuse the call later, because of the provided time stamp; (iii) an attacker from being able to reuse the call on a different managed node, since the certificate contains the name of the managed node; (iv) an attacker from generating his own call, since the certificate is digitally signed by the management server and this cannot be done by somebody else. Thus, the preferred embodiments provide security improvements in a switch user functionality without a password.

All publications and existing systems mentioned in this specification are herein incorporated by reference.

Although certain systems, methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method for providing a switch user functionality in a server-agent environment in an information technological (IT) network in which an agent runs on a node of the IT network, comprising:
   generating a switch user (SU) certificate upon receiving a request to switch from a first user account presently used on the node to a second user account;
   signing the SU certificate with a signature using a private key based on public-key cryptography;
   sending the SU certificate to the agent;
   authenticating the signature with a public key that is a counterpart of the private key;
   checking correctness of the SU certificate; and
   performing the requested switch to the second user account provided that the SU certificate is correct.

2. The method of claim 1, wherein the server-agent environment comprises a network management server and wherein the agent is a management agent running on a managed node.

3. The method of claim 1, wherein the SU certificate is generated by a designated server.

4. The method of claim 1, wherein the agent forwards the received SU certificate to a domain controller which checks the correctness of the SU certificate and allows the agent to perform the requested switch user.

5. The method of claim 1, wherein the public key is made public within the network or within a domain of the network in which the correctness of the SU certificate is checked.

6. The method of claim 1, wherein the checking the correctness of the SU certificate comprises verifying that the SU certificate originates from a designated server and has not been modified.

7. The method of claim 1, wherein the SU certificate contains no password relating to the second user account.

8. The method of claim 1, wherein the SU certificate comprises an user name for the second user account and an identification of the node for which the switch is to be performed.

9. The method of claim 1, wherein the SU certificate comprises a time stamp or another certificate identification stamp.

10. The method of claim 9, wherein the checking comprises verifying that the certificate is not outdated or has not been used before, by means of the time stamp or the certificate identification stamp.

11. A computer program product including program code for providing a switch user functionality in a server-agent environment in an information technological (IT) network in which an agent runs on a node of the IT network, said program code for:
   generating a switch user (SU) certificate using public-key cryptography upon receipt of a request to switch from a first user account presently used on the agent to a second user account;
   signing the SU certificate with a signature using a private key based on public-key cryptography;
   sending the SU certificate to the agent;
   authenticating the signature with a public key that is a counterpart of the private key;
   checking correctness of the SU certificate; and
   performing the requested switch to the second user account provided that the SU certificate is correct.

12. The computer program product of claim 11, wherein the server-agent environment comprises a network management server and wherein the agent is management agent running on a managed node.

13. The computer program product of claim 11, wherein the SU certificate is generated by a designated server.

14. The computer program product of claim 11, wherein the agent forwards the received SU certificate to a domain controller which checks the correctness of the SU certificate and allows the agent to perform the requested switch user.

15. The computer program product of claim 11, wherein the public key is made public within the network or within a domain of the network in which the correctness of the SU certificate is checked.

16. The computer program product of claim 11, wherein the checking the correctness of the SU certificate comprises verifying that the SU certificate originates from a designated server and has not been modified.

17. The computer program product of claim 11, wherein the SU certificate contains no password relating to the second user account.

18. The computer program product of claim 11, wherein the SU certificate comprises an account name for the second user account and an identification of the node for which the switch is to be performed.

19. The computer program product of claim 11, wherein the SU certificate comprises a time stamp or another certificate identification stamp.

20. The computer program product of claim 19, wherein the checking comprises verifying that the certificate is not outdated or has not been used before, by means of the time stamp or the certificate identification stamp.

21. A system for managing objects in an information technological (IT) network having a network management server and an agent which runs on a managed node of the IT network, said system provides a switch user functionality and comprises:

a switch user (SU) certificate generation component that generates an SU certificate upon receiving a request to switch from a first user account presently used on the node to a second user account, and signs the SU certificate with a signature using a private key based on public-key cryptography;

SU certificate sending component which sends the certificate to the agent;

an SU certificate checking component that authenticates the signature with a public key that is a counterpart of the private key, and checks correctness of the SU certificate; and a user account switching component performing the requested switch provided that the SU certificate is correct.

22. The system of claim 21, wherein the SU certificate generation component is a part of the management server.

23. The system of claim 21, wherein the SU certificate checking component is a part of a domain controller.

24. The system of claim 21, further comprising a public key publication component.

\* \* \* \* \*